United States Patent
Gottlieb et al.

(10) Patent No.: US 10,094,690 B2
(45) Date of Patent: Oct. 9, 2018

(54) ACOUSTICALLY ISOLATED ULTRASONIC TRANSDUCER HOUSING AND FLOW METER

(71) Applicant: Cameron International Corporation, Houston, TX (US)

(72) Inventors: Emanuel J. Gottlieb, Pittsburgh, PA (US); Kevin P. Minnock, Houston, TX (US); Donald R. Augenstein, Pittsburgh, PA (US); Richard A. Zuckerman, Somerville, MA (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/362,488

(22) Filed: Nov. 28, 2016

(65) Prior Publication Data

US 2017/0199065 A1    Jul. 13, 2017

Related U.S. Application Data

(63) Continuation of application No. 14/262,781, filed on Apr. 27, 2014, now Pat. No. 9,506,789.

(51) Int. Cl.
  *G01F 1/66* (2006.01)
(52) U.S. Cl.
  CPC .............. *G01F 1/662* (2013.01); *G01F 1/667* (2013.01)
(58) Field of Classification Search
  CPC .................................. G01F 1/662; G01F 1/667
  See application file for complete search history.

(56) References Cited

U.S. PATENT DOCUMENTS

| | | | |
|---|---|---|---|
| 4,211,279 A | 7/1980 | Isaacks | |
| 4,398,424 A | 8/1983 | Abts | |
| 6,876,128 B2 | 4/2005 | Nguyen | |
| 7,360,417 B2 * | 4/2008 | Dockendorff | G01F 23/2965 367/908 |
| 7,946,169 B2 * | 5/2011 | Dockendorff | G01F 23/2961 73/290 V |
| 8,181,533 B2 | 5/2012 | Allen et al. | |
| 2003/0047308 A1 | 3/2003 | Hirsch et al. | |
| 2004/0149039 A1 | 8/2004 | Cardelius | |
| 2011/0314932 A1 | 12/2011 | Straub, Jr. et al. | |
| 2012/0125121 A1 | 5/2012 | Gottlieb et al. | |
| 2012/0222492 A1 | 9/2012 | Quin et al. | |
| 2014/0053659 A1 | 2/2014 | Quin et al. | |

FOREIGN PATENT DOCUMENTS

EP        0952430 A1    10/1999

\* cited by examiner

*Primary Examiner* — Jewel V Thompson
(74) *Attorney, Agent, or Firm* — Eubanks PLLC

(57) ABSTRACT

An ultrasonic transducer apparatus is provided. In one embodiment, the apparatus includes an outer housing, an inner housing disposed within the outer housing, and an ultrasonic transducer disposed within the inner housing. The outer housing has an aperture that enables pressurized fluid to enter the outer housing while allowing the outer housing to acoustically isolate the inner housing and the ultrasonic transducer from an additional component when the outer housing is connected to the additional component. Additional systems, devices, and methods are also disclosed.

8 Claims, 6 Drawing Sheets

ACOUSTICALLY ISOLATED ULTRASONIC TRANSDUCER HOUSING AND FLOW METER

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once a desired subterranean resource such as oil or natural gas is discovered, drilling and production systems are often employed to access and extract the resource. These systems may be located onshore or offshore depending on the location of a desired resource. Further, such systems generally include a wellhead assembly mounted on a well through which the resource is accessed or extracted. These wellhead assemblies may include a wide variety of components, such as various casings, valves, hangers, pumps, fluid conduits, and the like, that facilitate drilling or production operations.

Flow meters can be used to measure fluids (e.g., production fluids and injection fluids) passing through conduits at a wellsite. In some instances, operators use ultrasonic flow meters for such measurements. Ultrasonic flow meters include ultrasonic transducers for transmitting and detecting ultrasonic waves in a fluid passed through the meter. The flowing fluid interacts with the ultrasonic waves transmitted through the fluid. This allows the received ultrasonic waves to be used to infer characteristics of the fluid, such as velocity and volumetric flow rate.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to ultrasonic flow meters and transducer assemblies. As noted above, ultrasonic flow meters use transducers to measure characteristics of fluids from ultrasonic waves transmitted through the fluids. But while these transducers receive the ultrasonic waves transmitted through the fluids, they may also receive ultrasonic noise that can negatively impact measurement accuracy. One example of such noise includes ultrasonic waves transmitted to the transducers through the body of the flow meters themselves, rather than through the fluids. In certain embodiments of the present technique, however, ultrasonic transducers are acoustically isolated from the flow meter bodies to reduce acoustic noise transmitted through the bodies to the transducers. In one embodiment, an ultrasonic transducer is provided in a housing, which is itself positioned inside a sheath. Once installed, the sheath holds the housing in place within a flow meter body while acoustically isolating the housing from the flow meter body. The sheath may also allow the housing to be in pressure balance with the pressure of the measured fluid within the flow meter body.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
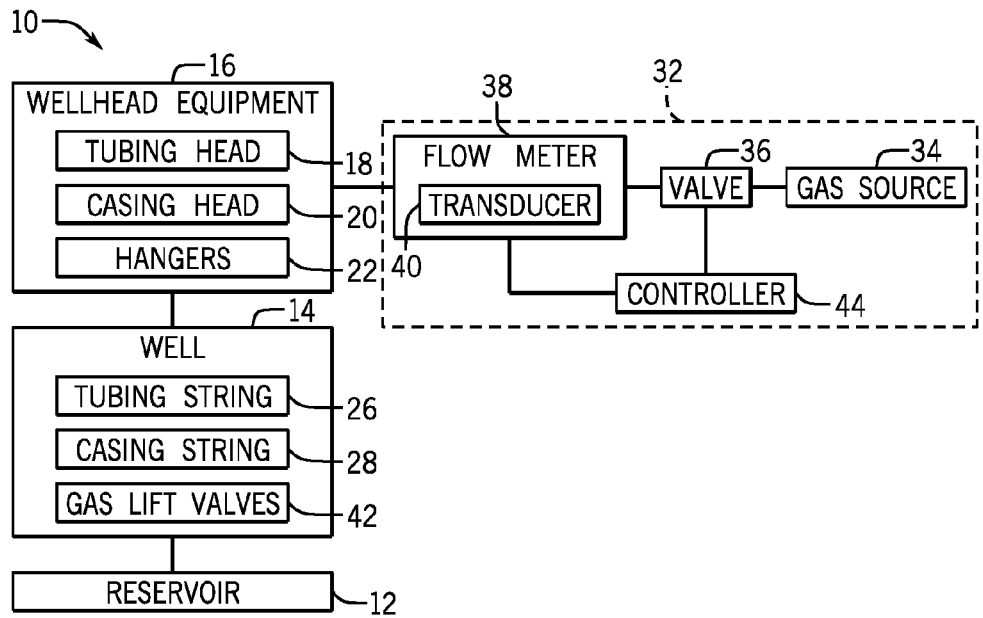
FIG. 1 generally depicts various components that can be installed at a well, including a gas lift injection system for facilitating production, in accordance with one embodiment of the present disclosure.

Turning now to the present figures, a system 10 is illustrated in FIG. 1 in accordance with one embodiment. Notably, the system 10 is a production system that facilitates extraction of a resource, such as oil, from a reservoir 12 through a well 14. Wellhead equipment 16 is installed on the well 14. As depicted, the wellhead equipment 16 includes at least one tubing head 18 and casing head 20, as well as wellhead hangers 22. But the components of the wellhead equipment 16 can differ between applications, and could include a variety of casing heads, tubing heads, spools, hangers, sealing assemblies, stuffing boxes, pumping tees, and pressure gauges, to name only a few possibilities.

The wellhead hangers 22 can be positioned within hollow wellhead bodies (e.g., within the tubing and casing heads). Each of the hangers 22 can be connected to a tubular string, such as a tubing string 26 or a casing string 28, to suspend the string within the well 14. As will be appreciated, wells are often lined with casing that generally serves to stabilize the wells and to isolate fluids within the wellbores from certain formations penetrated by the wells (e.g., to prevent contamination of freshwater reservoirs). Tubing strings facilitate flow of fluids through the wells.

In some instances, resources accessed via wells are able to flow to the surface by themselves. This is typically the case with gas wells, as the accessed gas has a lower density than air. This can also be the case for oil wells if the pressure of the oil is sufficiently high to overcome gravity. But often the oil does not have sufficient pressure to flow to the surface and it must be lifted to the surface through one of various methods known as artificial lift. Artificial lift can also be used to raise other resources through wells to the surface, or for removing water or other liquids from gas wells. In one form of artificial lift, compressed gas is injected into oil wells. This injected lift gas dissolves in the oil (or other produced liquid) and also forms bubbles, lowering the fluid density and causing the oil to flow up wellbores to the surface. The injected lift gas can then be collected from the oil and recycled.

As depicted in FIG. 1, artificial lift is provided by a gas lift injection system 32, though it is noted that other arrangements for providing artificial lift could be used. The injection system 32 includes a source 34 of gas that can be injected into the well 14 through the wellhead equipment 16. The gas can be compressed natural gas, for example, which could be produced from the well 14 itself or from some other well. The source 34 can include a local or remote compression facility, storage bottles, or any other suitable source. The lift gas can be injected into the well 14 from the source 34 continuously or intermittently.

A valve 36 (e.g., an adjustable choke or other control valve) regulates flow of the gas from the source 34 into the well 14, while a flow meter 38 measures the amount of gas flowing into the well. Any suitable flow meter could be used, but in at least some embodiments the flow meter 38 is provided as an ultrasonic flow meter having at least one ultrasonic gas transducer 40, which enables measurement of the gas flow rate through the flow meter 38 using ultrasound.

Gas lift valves 42 can be spaced along the tubing sting 26. These gas lift valves 42 open to allow lift gas injected down the well to flow into the tubing string 26, where it dissolves in the fluid to be produced (e.g., oil) and also forms bubbles. And as noted above, this promotes flow of the fluid up the tubing string 26 to the surface.

The gas lift injection system 32 can also include a controller 44. The controller 44 can be used to manage operation of the valve 36 (e.g., regulating flow) and to determine flow rates of the injected fluid through the flow meter 38 with data from the transducer 40. The controller 44 can include any suitable hardware or software for providing this functionality. For instance, in one embodiment the controller 44 includes a processor for executing software instructions (e.g., stored in a suitable memory device) to control operation of the valve 36 and to calculate flow rates through the flow meter 38 using data from the transducer 40. The controller 44 can also include various input and output devices to receive data or facilitate interaction with an operator. The flow rate through the flow meter 38 can be determined in any suitable manner. In some embodiments, one or more pairs of transducers 40 are used to measure transit times of ultrasonic waves in fluid flowing through the flow meter 38. Ultrasonic waves traveling in the direction of fluid flow (from an upstream transducer 40 to a downstream transducer 40) will have a lower transit time than ultrasonic waves traveling against the fluid flow (from the downstream transducer 40 to the upstream transducer 40). The difference in these downstream and upstream transit times can be used to determine the velocity and volumetric flow rate of the fluid flowing through the flow meter 38.

Figure 2:
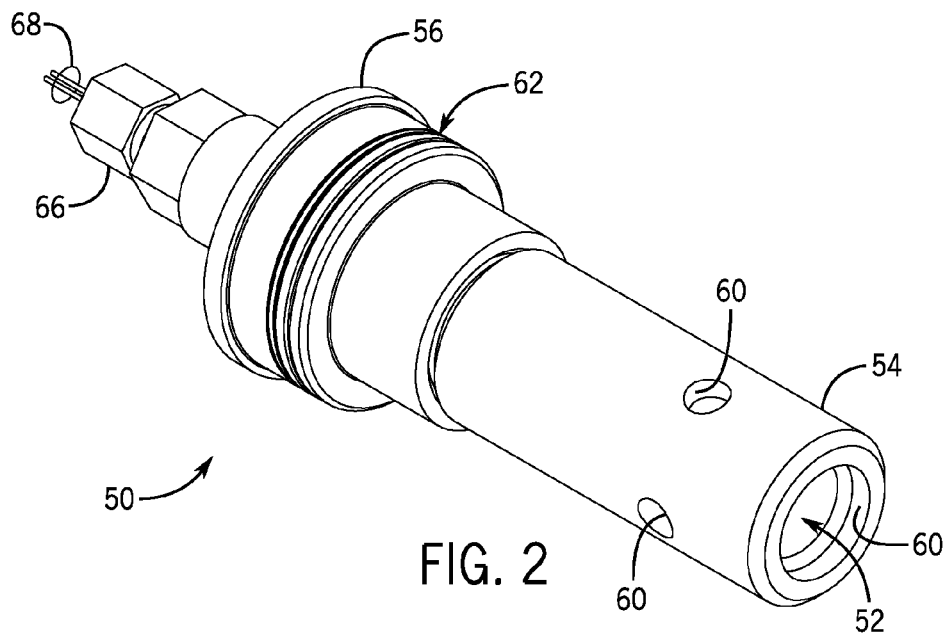
FIG. 2 is a perspective view of an ultrasonic transducer assembly that can be used in measuring flow of a fluid through a conduit, such as through a body of a flow meter of the gas lift injection system of FIG. 1, in accordance with one embodiment.

One example of an ultrasonic transducer assembly 50 that can be used during measurement of velocity and flow rate through the flow meter 38 is depicted in FIG. 2. In this embodiment, the ultrasonic transducer assembly 50 includes a transducer housing 52 (also referred to as an inner housing) received within a sleeve or sheath 54 (also referred to as an outer housing). In at least some instances, the sheath 54 is formed in whole or in part from material exhibiting high attenuation of acoustic waves at the operating frequency of an ultrasonic transducer (e.g., transducer 112 of FIG. 5) within the transducer housing 52 so that the sheath 54 acoustically isolates the housing 52 (and the enclosed transducer) from other elements of the assembly 50 and the flow meter 38. This reduces acoustic short-circuiting of the transducer housing 52 to the main body of the flow meter 38, reducing sampling noise and increasing signal-to-noise ratio of the data collected by the transducer. In at least some embodiments, the transducer housing 52 includes a metal body (e.g., made with titanium, a HASTELLOY® alloy, a beryllium copper alloy, or another alloy) and the sheath 54 includes a non-metal body, such as a plastic body (e.g., made with polyetheretherketone (PEEK), ULTEM™, or VESPEL®). Moreover, the plastic body of the sheath 54 could also be filled with or reinforced by glass or other materials to facilitate acoustic isolation of the transducer housing 52 from other components outside the sheath 54.

The depicted sheath 54 is coupled to a carrier 56. The sheath 54 acoustically isolates the transducer housing 52 and its internal components from the carrier 56, as well as from a flow meter body when the transducer assembly 50 is installed as part of a flow meter. More specifically, in at least some embodiments (e.g., those depicted in FIGS. 4-7), the sheath 54 enables the transducer housing 52 to be positioned in space at a specific location within the meter body such that the housing 52 is in pressure balance with the pressure of the fluid passing through the flow meter during operation (e.g., gas injected into the well 14 from the gas source 34). The sheath 54 includes apertures or ports 60 that enable fluid to flow inside the sheath 54 about the transducer housing 52. Further, the sheath 54 is interposed in the acoustic path between the transducer housing 52 and the carrier 56 and attenuates any acoustic waves to or from the transducer housing along this path. In instances in which the housing 52 and the carrier 56 are both metal, the interposed sheath 54 also prevents metal-to-metal contact of the carrier 56 with the housing 52.

The carrier 56 includes a seal assembly 62 to inhibit leakage when the ultrasonic transducer assembly 50 is installed in a flow meter body. The assembly 50 also includes a connector 66 and wires 68 that enable communication with the controller 44 or other components. The connector 66 can include a feed-through glass-to-metal seal that allows wires 68 to pass into the carrier 56 and to the transducer housing 52 while preventing fluid flow through the connector 66.

Figure 3:
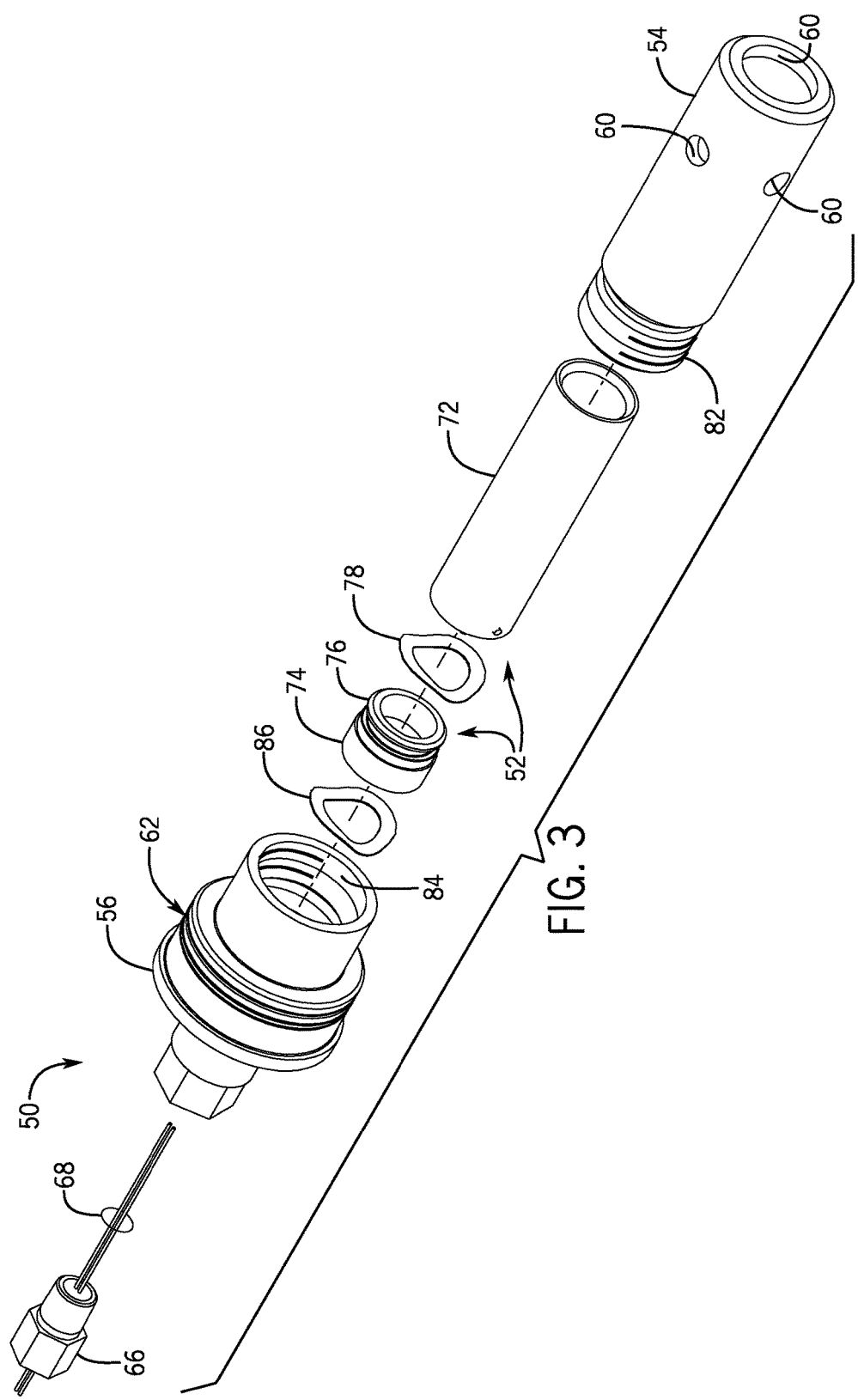
FIG. 3 is an exploded view of the ultrasonic transducer assembly of FIG. 2 in accordance with one embodiment.

Additional features of the ultrasonic transducer assembly 50 are shown in the exploded view of FIG. 3. For instance, the transducer housing 52 includes a hollow tube 72 for receiving an ultrasonic transducer and a cap 74 for closing the end of the hollow tube. The cap 74 includes a seal groove 76 for receiving a seal (e.g., an o-ring). When the end of the cap 74 is inserted into the hollow tube 72, the seal engages the inner wall of the tube 72 and isolates the interior chamber of the hollow tube 72 (in which the ultrasonic transducer is disposed) from pressure in the environment outside the housing 52. For example, in one embodiment the housing 52 can maintain atmospheric pressure within its interior while exposed to flow meter operating pressures (e.g., up to 10,000 psi) at its exterior. A spring 78 can also be provided to resist movement of components (e.g., an ultrasonic transducer and spacing elements) within the housing 52.

The transducer housing 52 can be inserted into the sheath 54, which can then be coupled to the carrier 56 in any suitable manner. In the presently depicted embodiment, the sheath 54 and the carrier 56 include mating threaded portions 82 and 84 that allow these components to be threaded to one another. A spring 86 provides a positive biasing force on the transducer housing 52 and resists movement of the transducer housing 52 within the sheath 54.

Figure 4:
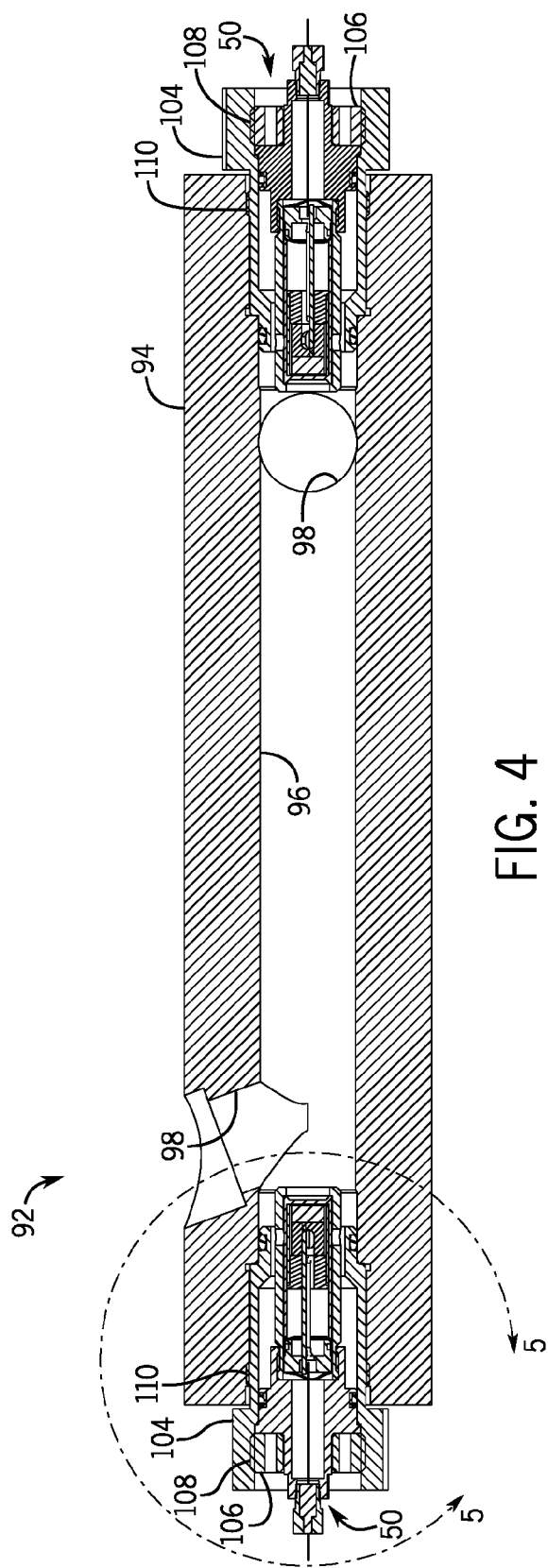
FIG. 4 depicts a pair of the ultrasonic transducer assemblies of FIGS. 2 and 3 coupled to a flow meter body with bushings in accordance with one embodiment.

By way of further example, a flow meter 92 having a pair of ultrasonic transducer assemblies 50 coupled to a meter body 94 is depicted in FIG. 4. In this embodiment, the ultrasonic transducer assemblies 50 are installed in-line with one another in a conduit 96 along the flow axis of the meter body 94, although the assemblies 50 could be installed off-axis to measure diagonally with respect to the flow axis. When an artificial lift gas or other fluid is routed through the conduit 96 via inlet and outlet ports 98, the ultrasonic transducers of the assemblies 50 can be used to determine fluid velocity and flow rate. The fluid flowing in the conduit 96 is pressurized and the ports 60 allow the pressurized fluid to pass into the sheaths 54 and surround the transducer housings 52 of the assemblies 50 so that the housings 52 are in pressure balance with the fluid. As noted above, the housings 52 can be sealed to inhibit flow of the pressurized fluid into the housings 52 and to maintain a pressure differential between the interior and exterior of the housings 52 during use. The sheaths 54 of the assemblies 50 acoustically isolate the housings 52 and inhibit transmission of ultrasonic waves between the two assemblies 50 through the meter body 94.

Figure 5:
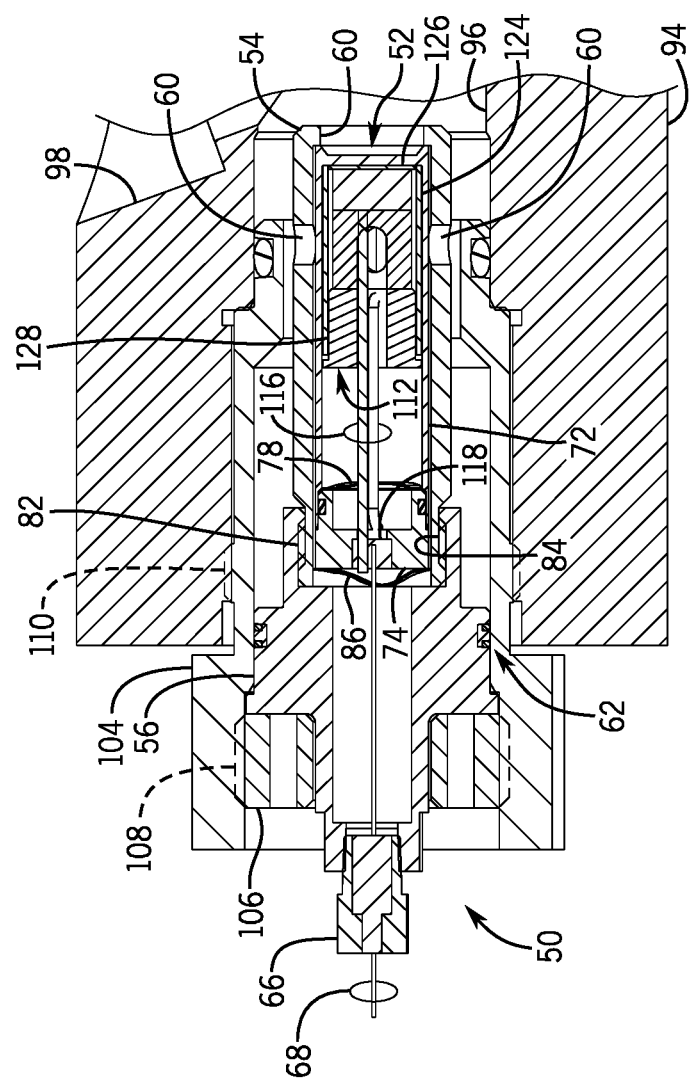
FIG. 5 is a detail view of one of the ultrasonic transducer assemblies installed in the flow meter body of FIG. 4.
Figure 6:
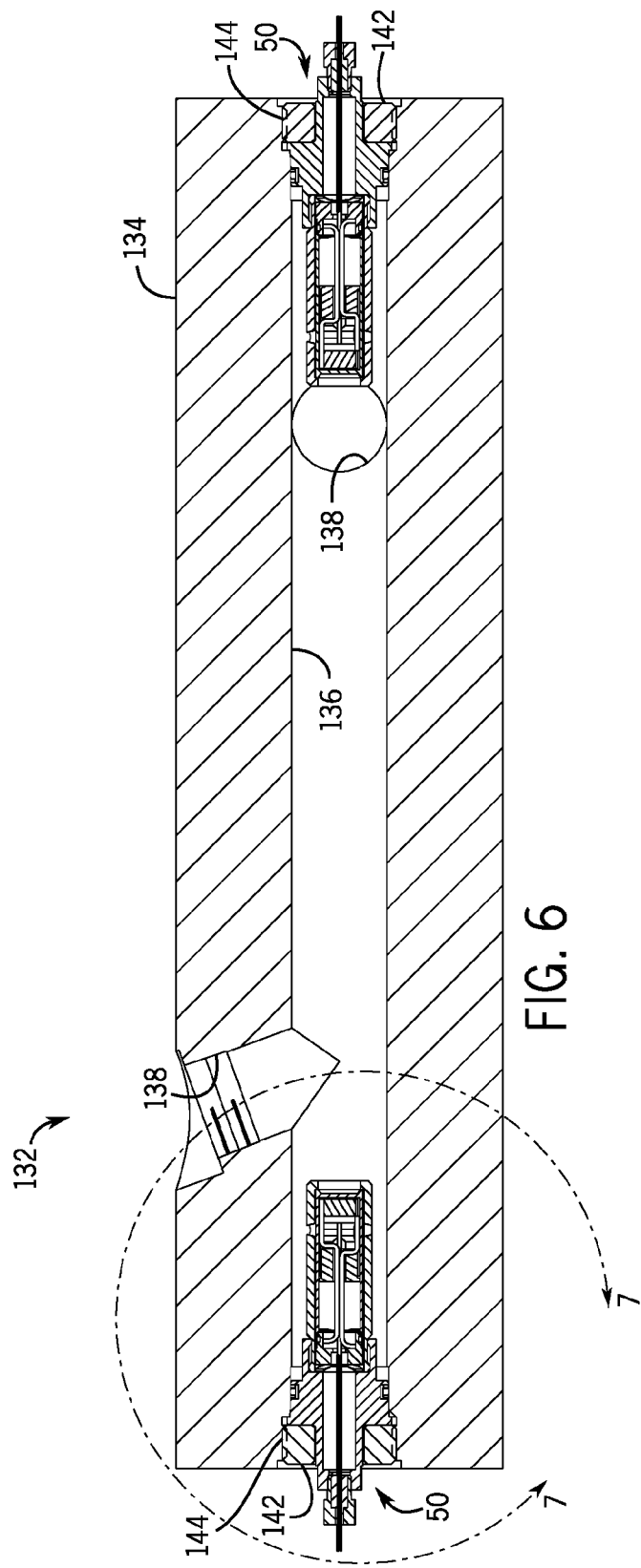
FIG. 6 depicts a pair of the ultrasonic transducer assemblies of FIGS. 2 and 3 coupled to a flow meter body in accordance with another embodiment.
Figure 7:
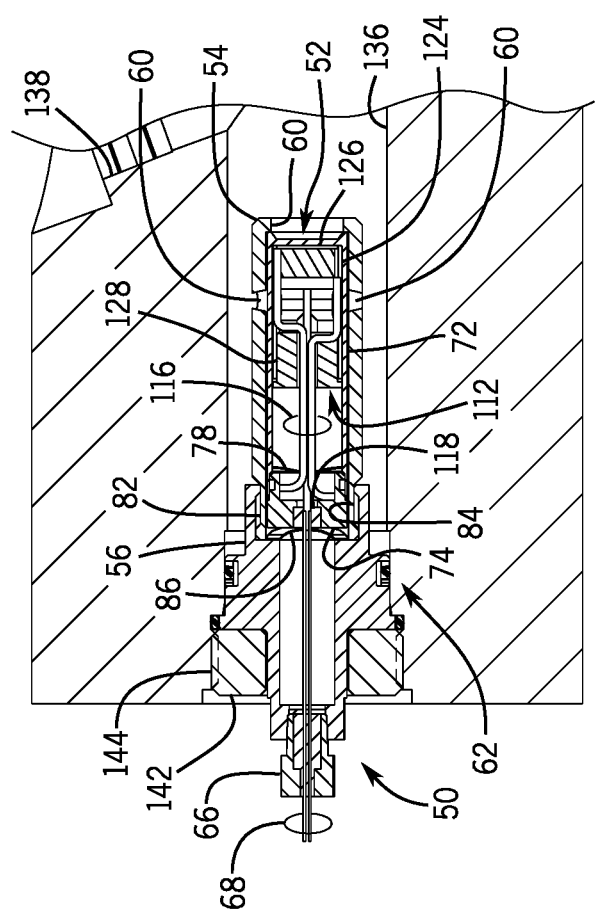
FIG. 7 is a detail view of one of the ultrasonic transducer assemblies installed in the flow meter body of FIG. 6.

As shown here in FIG. 4, the ultrasonic transducer assemblies 50 are installed in bushings 104 coupled to the meter body 94. More specifically, and as shown in greater detail in FIG. 5, the carrier 56 of each assembly 50 is retained within a bushing 104 with a nut 106 coupled to the bushing 104 via a threaded interface 108. That is, as shown here, the nut 106 has external threads that mate with internal threads of the bushing 104. The nut 106 retains a lip of the carrier 56 between the nut 106 and an internal shoulder of the bushing 104 and limits movement of the assembly 50 within the meter body 94. As also depicted in FIGS. 4 and 5, the bushing 104 can be coupled to the meter body 94 via a threaded interface 110. The bushing 104 can be made of any suitable material, but in at least one embodiment the bushing 104 is formed of a non-metal material (e.g., plastic) and serves to acoustically isolate the carrier 56 from the meter body 94 and reduce acoustic short-circuiting between these two components.

An ultrasonic transducer 112 disposed within the ultrasonic housing 52 is also shown in FIG. 5 in accordance with one embodiment. In at least some embodiments, the ultrasonic transducer 112 is capable of both transmitting and receiving ultrasonic waves. As will be appreciated, ultrasonic transducers 112 can include active elements for converting electrical energy to ultrasonic energy (for emitting ultrasonic waves) and vice versa (for measuring received ultrasonic waves). Any suitable active elements could be used, such as piezoelectric ceramic, polymer, or composite elements. Further, the ultrasonic transducers 112 can operate at any desired frequency. In at least some embodiments, the ultrasonic transducers 112 operate at a frequency within a range of 80 kHz to 400 kHz, inclusive, though other operating frequencies could be used in additional embodiments.

Electrical signals can be transmitted to and from the active elements via electrical leads 116. For instance, the leads 116 can communicate electrical excitation signals to the transducer 112 to cause transmission of ultrasonic waves; the leads 116 can also communicate electrical signals representative of ultrasonic waves received by the transducer 112. In the depicted embodiment, a glass feed-through connector 118 seals the end of the housing 52 to prevent pressure transmission while allowing the leads 116 to be connected to the wires 68, thus facilitating electrical communication between the transducer 112 and the controller 44 or other external components.

The active elements of the transducers 112 can be disposed in the transducer housing 52 with various arrangements. As generally shown in FIG. 5, the transducers 112 can include tubes 124 for receiving internal components (e.g., active elements). The ends of the each tube 124 can be closed with a plate or window 126 and a cap or plug 128. In at least some embodiments the window 126 is welded to the tube 124.

While the ultrasonic transducer assemblies 50 can be coupled to the meter body 94 with bushings 104, they can also be coupled to meter bodies in different manners. For example, in one embodiment depicted in FIGS. 6 and 7, a flow meter 132 includes ultrasonic assemblies 50 coupled directly to a meter body 134 without intermediate bushings. The meter body 134 includes a conduit 136 with inlet and outlet ports 138. Like in the flow meter 92, the ultrasonic transducer assemblies 50 can be positioned in the conduit 136 in-line with one another along the flow axis of the meter body 134. Nuts 142 (which are identical to the nuts 106 in at least some embodiments) can be threaded into the meter body 134 at threaded interfaces 144 to retain the ultrasonic transducer assemblies 50. The sheaths 54 reduce acoustic short-circuiting between the transducer housings 52 and the meter body 134 (through the carriers 56) and attenuate ultrasonic noise that would otherwise be transmitted to the ultrasonic transducers 112. Experimentation has shown that the acoustic isolation described herein can improve the signal-to-noise ratio up to 28 dB compared to conventional methods, providing increased measurement accuracy and reliability.

Additionally, although certain embodiments are described above with respect to ultrasonic metering of an artificial lift gas injected in a well, it is noted that the techniques described above could be used in other contexts as well. For instance, the ultrasonic transducer assemblies 50 could be used in some embodiments to measure the flow of other gases. Further, ultrasonic transducers can be acoustically isolated, such as in the manners described above, and used for ultrasonic metering of liquids in accordance with the present techniques. And while the acoustically isolated transducer assemblies 50 can be used in oilfield contexts, such as those described above, such assemblies could also be used for other applications.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An ultrasonic transducer apparatus comprising:
an outer housing;
an inner housing disposed within the outer housing; and
an ultrasonic transducer disposed within the inner housing;
wherein the outer housing includes an aperture that enables pressurized fluid to enter the outer housing while allowing the outer housing to acoustically isolate the inner housing and the ultrasonic transducer from an additional component when the outer housing is connected to the additional component.

2. The ultrasonic transducer apparatus of claim 1, wherein the additional component is a plug coupled to a flow meter body.

3. The ultrasonic transducer apparatus of claim 2, wherein the outer housing is threaded to the plug.

4. The ultrasonic transducer apparatus of claim 3, wherein the inner housing and the plug are metal and the outer housing prevents metal-to-metal contact of the inner housing with the plug.

5. A method comprising:
inserting an ultrasonic transducer housing into a sleeve having a fluid port;
coupling the sleeve to a carrier; and
coupling the carrier to a flow meter body such that the ultrasonic transducer is positioned in space within a conduit of the flow meter body and the fluid port places an interior of the sleeve about the ultrasonic transducer housing in fluid communication with the conduit.

6. The method of claim 5, wherein coupling the carrier to the flow meter body includes installing the carrier in a bushing and coupling the bushing to the flow meter body.

7. The method of claim 5, wherein coupling the carrier to the flow meter body includes coupling the carrier to the flow meter body such that the ultrasonic transducer is positioned in-line with a direction in which a fluid would flow through the conduit when traveling between inlet and outlet ports of the flow meter body.

8. The method of claim 7, comprising using the ultrasonic transducer to measure flow rate of the fluid routed through the conduit.

* * * * *